United States Patent [19]

Uetake

[11] Patent Number: 4,787,723

[45] Date of Patent: Nov. 29, 1988

[54] ULTRA-WIDE ANGLE F-$\theta$ LENS SYSTEM

[75] Inventor: Toshifumi Uetake, Tokyo, Japan

[73] Assignee: Copal Electronics Co., Ltd., Tokyo, Japan

[21] Appl. No.: 919,022

[22] Filed: Oct. 15, 1986

[30] Foreign Application Priority Data

Oct. 15, 1985 [JP] Japan .................. 60-227828

[51] Int. Cl.$^4$ .................. G02B 9/14; G02B 26/10
[52] U.S. Cl. .................. 350/475; 350/6.8
[58] Field of Search .................. 350/6.8, 474, 475

[56] References Cited

U.S. PATENT DOCUMENTS 4,401,362 8/1983 Maeda .................. 350/6.8

Primary Examiner—John K. Corbin
Assistant Examiner—Ronald M. Kachmarik
Attorney, Agent, or Firm—Saidman, Sterne, Kessler & Goldstein

[57] ABSTRACT

An ultra-wide angle f-$\theta$ lens system comprising, in the order from the light beam deflector side, a first lens component having positive power, a second lens component having negative power, and a third lens component having positive power, the ultra-wide angle f-$\theta$ lens system being arranged to have an ultra-wide scanning angle widened to $\pm 45°$ and exhibiting an imaging performance of laser beam waist close to the diffraction limit in spite of the fact that the f-$\theta$ lens system comprises a small number of lenses.

6 Claims, 6 Drawing Sheets

LATERAL SPHERICAL ABERRATION

ASTIGMATISM

SCANNING LINEARITY

COMA

LATERAL SPHERICAL ABERRATION

ASTIGMATISM

SCANNING LINEARITY

COMA

LATERAL SPHERICAL ABERRATION
F/N34.5
-0.005  0.005

ASTIGMATISM
44.7°
-1.0  1.0

SCANNING LINEARITY
44.7°
-0.5 (%) 0.5

COMA
44.7°
-F/N34.5  F/N34.5
0.02 / -0.02

31.3°
-F/N34.5  F/N34.5
0.02 / -0.02

ULTRA-WIDE ANGLE F-θ LENS SYSTEM

BACKGROUND OF THE INVENTION (a) Field of the Invention

The present invention relates to an ultra-wide angle f-θ lens system and, more particularly, to an ultra-wide angle f-θ lens system with a scanning angle (field angle) widened to ±45°.

(b) Description of the Prior Art

As office automation systems are coming into wider use in these days, it is required to provide a more compact laser beam printer at a still lower price. To make an office automation system more compact, it is necessary to arrange that the f-θ lens system to be used therein has an ultra-wide scanning angle.

However, in case of standard type f-θ lens systems which are already put on the market, the scanning angle thereof is not wider than ±25°. Even in the case of wide angle f-θ lens systems, the scanning angle thereof is not wider than ±30°. In other words, there exists almost no known f-θ lens system which has a scanning angle wider than ±30° and, at the same time, which shows an imaging performance of laser beam waist close to the diffraction limit on the light-sensitive drum surface in the state that the scanning linearity (f-θ characteristics) is ensured to the degree that is satisfactory for practical use (±0.7% or smaller).

SUMMARY OF THE INVENTION

It is, therefore, a primary object of the present invention to provide an ultra-wide angle f-θ lens system having a scanning angle (field angle) widened to ±45° and, moreover, arranged to show an imaging performance of laser beam waist close to the diffraction limit on the light-sensitive drum surface.

To attain the above-mentioned object, the ultra-wide angle f-θ lens system according to the present invention is arranged to comprise, in the order from the light beam deflector side, a first lens component having positive power, a second lens component having negative power, and a third lens component having positive power, said ultra-wide angle f-θ lens system being further arranged to fulfill the following conditions:

$$0.19F_0 \leq L \leq 0.23F_0 \quad (1)$$

$$-0.35 \leq R_2/F_0 \quad (2)$$

$$1.60 \leq n \quad (3)$$

$$-5.0F_0 \geq F_{12} \quad (4)$$

where, reference symbol L represents the overall length of the lens system as a whole, reference symbol $F_0$ represents the focal length of the lens system as a whole, reference symbol $R_2$ represents the radius of curvature of the surface on the light beam deflector side of the first lens component, reference symbol n represents the refractive index of the third lens component for the wavelegth of 780 nm, and reference symbol $F_{12}$ represents the total focal length of the group comprising first and second lens components.

If L is made larger than the upper limit ($0.23F_0$) of the condition (1), the clearance between the light beam deflector and f-θ lens system becomes too small. As a result, in case of an ultra-wide angle f-θ lens system like the f-θ lens system according to the present invention, the peripheral portion of the first lens component, whose diameter is to be decided by the scanning angle for the trigger signal, interferes with the laser beam which enters the light beam deflector and, therefore, the f-θ lens system becomes unsuitable for practical use. Moreover, the refractive power of the negative lens constituting the lens system becomes excessively strong. As a result, asymmetrical inside coma for rays at certain scanning angles (offaxial rays) increases, and the image of the laser beam waist deteriorates to an extent exceeding a level that is negligible.

On the other hand, if L is made smaller than the lower limit ($0.19F_0$) of the condition (1), the refractive powers of the positive lenses constituting the lens system become excessively strong to refract the incident rays at a large scanning angle (offaxial rays), and asymmetrical outside coma for rays at certain scanning angles (offaxial rays) increases.

If, in the condition (2), it becomes $R_2F_0 < -0.35$, the scanning linearity chiefly becomes unfavourable.

If n is made smaller than the lower limit (1.60) of the condition (3), curvature of field and asymmetrical coma become unfavourable, and it is impossible to ensure a practically sufficient spot size over the whole scanning width.

The condition (4) is established in order to chiefly eliminate astigmatism and curvature of field at the intermediate scanning angle. If it becomes $F_{12} > -5.0F_0$, astigmatism will be especially overcorrected and, when it is arranged that the meridional image surface coincides with the light-sensitive drum surface, curvature of field will be considerably undercorrected.

DETAILED DESCRIPTION OF THE PREFERRED EMBODIMENTS

Now, preferred embodiments of the ultra-wide angle f-θ lens system according to the present invention are shown below.

Figure 1:
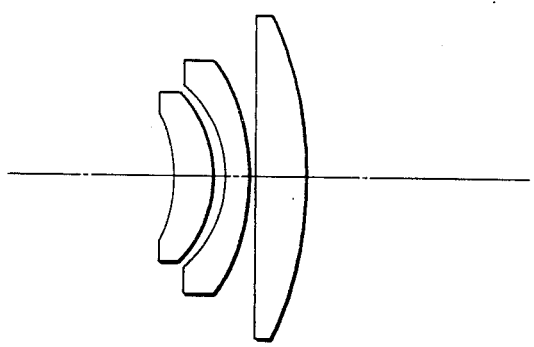
FIG. 1 shows a sectional view of the ultra-wide angle f-θ lens system according to the present invention.
Figure 2:
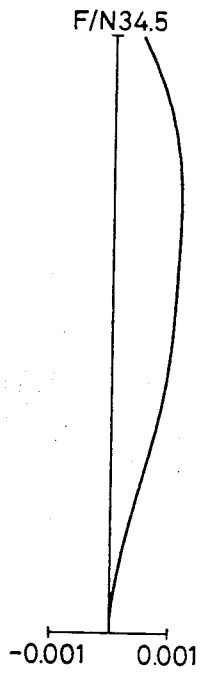
FIG. 2 shows graphs illustrating aberration curves of Embodiment 1 of the present invention.
Figure 2:
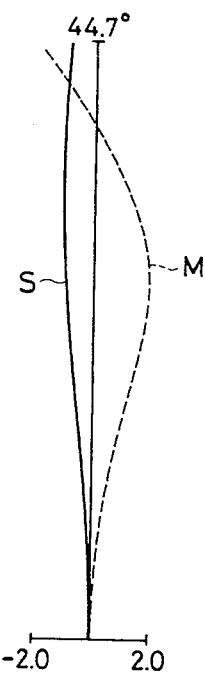
Figure 2:
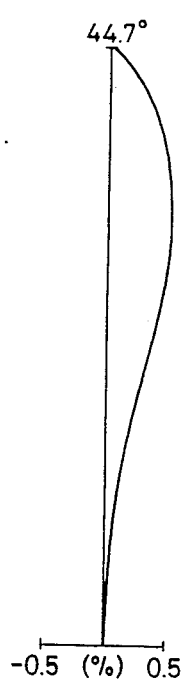
Figure 2:
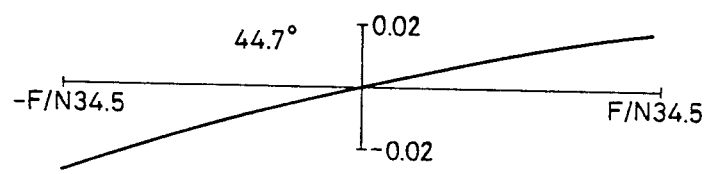
Figure 2:
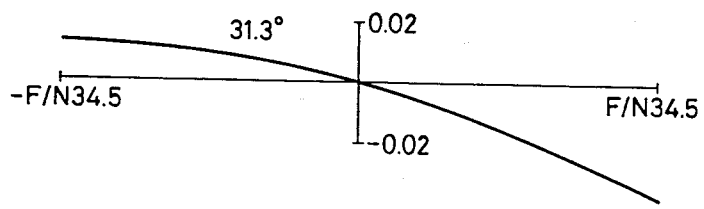
Figure 3:
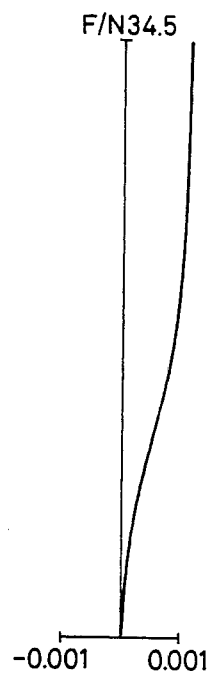
FIG. 3 shows graphs illustrating aberration curves of Embodiment 2 of the present invention.
Figure 3:
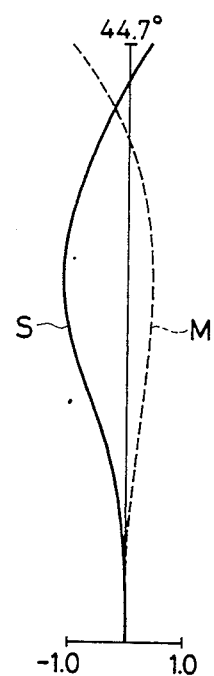
Figure 3:
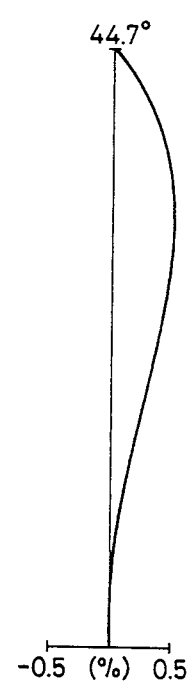
Figure 3:
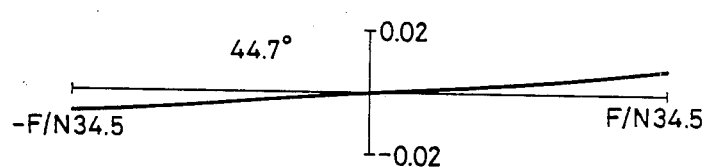
Figure 3:
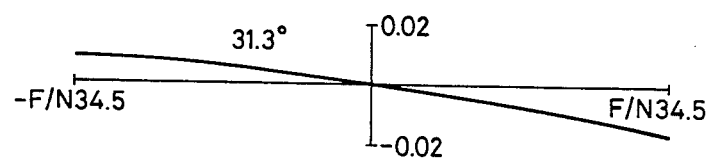
Figure 4:
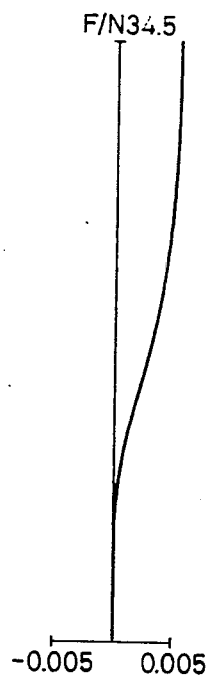
FIG. 4 shows graphs illustrating aberration curves of Embodiment 3 of the present invention.
Figure 4:
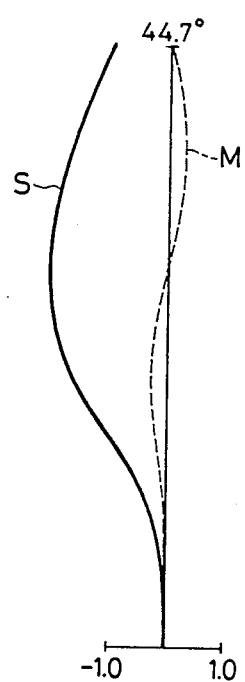
Figure 4:
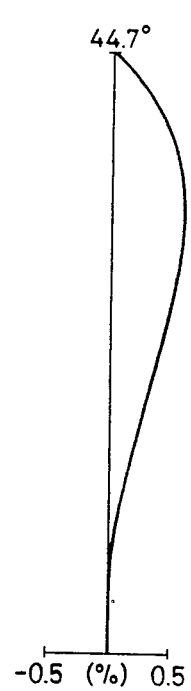
Figure 4:
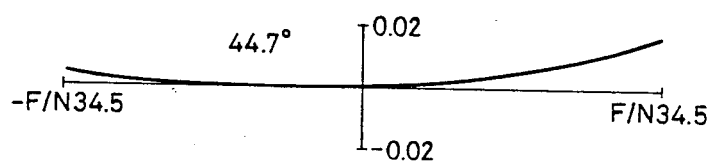
Figure 4:
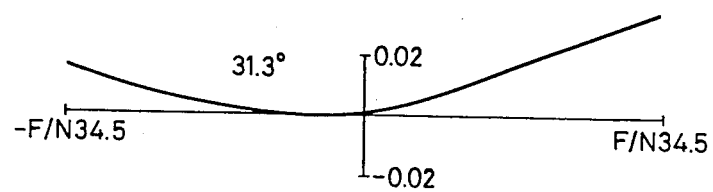
Figure 5:
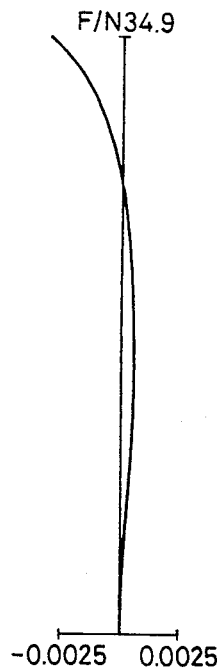
FIG. 5 shows graphs illustrating aberration curves of Embodiment 4 of the present invention.
Figure 5:
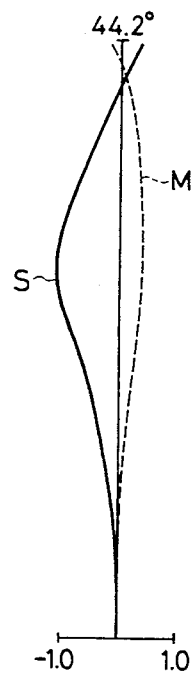
Figure 5:
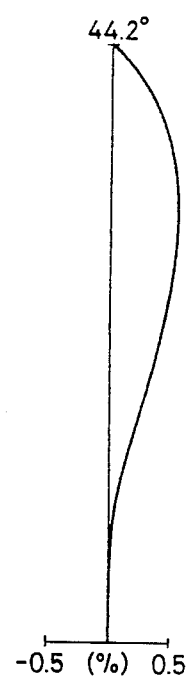
Figure 5:
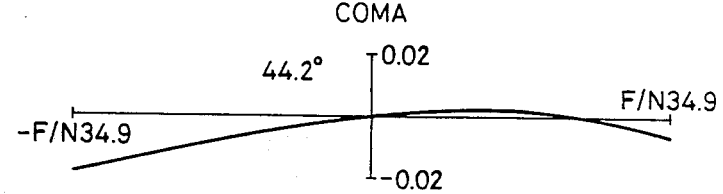
Figure 5:
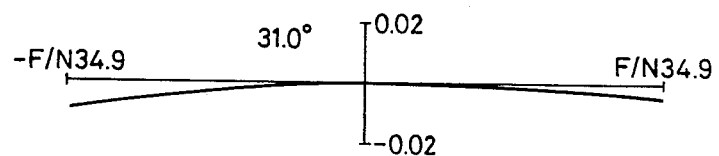
Figure 6:
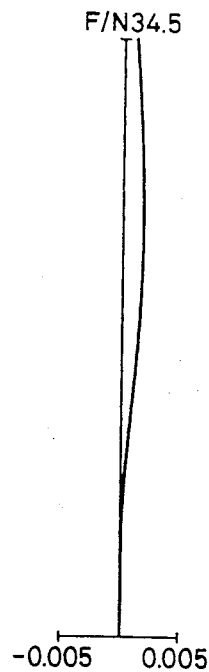
FIG. 6 shows graphs illustrating aberration curves of Embodiment 5 of the present invention.
Figure 6:
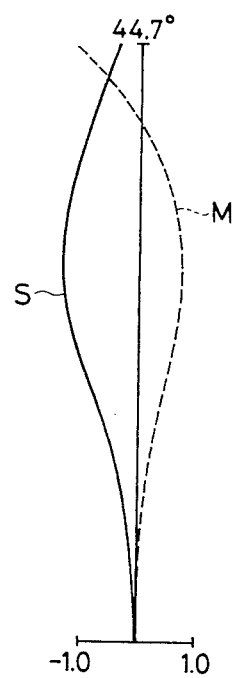
Figure 6:
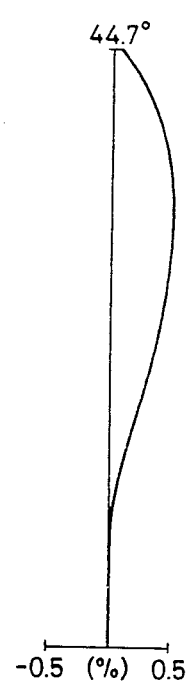
Figure 6:
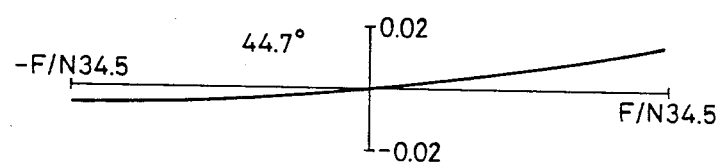
Figure 6:
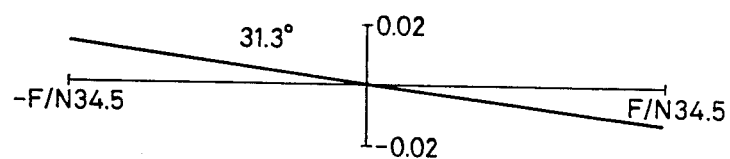

Each of said preferred embodiments of the ultra-wide angle f-θ lens system according to the present invention has the lens configuration as shown in FIG. 1 and is arranged that the first lens component is formed as a positive meniscus lens, the second lens component is formed as a negative meniscus lens, and the third lens component is formed as a plano-convex lens. Numerical data of respective embodiments are as shown below.

Embodiment 1

$F_0 = 137.93$
$F/N = 1:34.5$
$W = \pm 44.7°$

| | R | TH | N |
|---|---|---|---|
| 1 | ∞ | 16.2 | |

-continued

| | | | |
|---|---|---|---|
| 2 | −29.35 | 8.0 | 1.6280 |
| 3 | −25.03 | 3.0 | |
| 4 | −24.93 | 6.0 | 1.5107 |
| 5 | −39.83 | 1.0 | |
| 6 | ∞ | 11.0 | 1.6280 |
| 7 | −86.28 | | |

$L = 29.0 = 0.210F_0$, $R_2/F_0 = -0.2128$
$N_3 = 1.6280$, $F_{12} = -846.12 = -6.134F_0$

Embodiment 2

$F_0 = 137.90$
$F/N = 1:34.48$
$W = \pm 44.7°$

| | R | TH | N |
|---|---|---|---|
| 1 | ∞ | 16.2 | |
| 2 | −31.50 | 8.52 | 1.7381 |
| 3 | −30.10 | 3.00 | |
| 4 | −28.88 | 6.00 | 1.5107 |
| 5 | −39.80 | 1.00 | |
| 6 | ∞ | 9.00 | 1.7381 |
| 7 | −109.18 | | |

$L = 27.52 = 0.1996F_0$, $R_2/F_0 = -0.2284$
$N_3 = 1.7381$, $F_{12} = -1536.5 = -11.14F_0$

Embodiment 3

$F_0 = 138.1$
$F/N = 1:34.5$
$W = \pm 44.7°$

| | R | TH | N |
|---|---|---|---|
| 1 | ∞ | 23.00 | |
| 2 | −37.21 | 8.00 | 1.7381 |
| 3 | −25.44 | 0.80 | |
| 4 | −24.67 | 6.00 | 1.5107 |
| 5 | −57.64 | 0.50 | |
| 6 | ∞ | 11.00 | 1.7381 |
| 7 | −103.79 | | |

$L = 26.30 = 0.1905F_0$, $R_2/F_0 = -0.2694$
$N_3 = 1.7381$, $F_{12} = -1633.97 = -11.832F_0$

Embodiment 4

$F_0 = 139.4$
$F/N = 1:34.9$
$W = \pm 44.2°$

| | R | TH | N |
|---|---|---|---|
| 1 | ∞ | 20.00 | |
| 2 | −37.460 | 9.00 | 1.7381 |
| 3 | −25.107 | 3.00 | |
| 4 | −25.992 | 6.50 | 1.5107 |
| 5 | −68.121 | 1.00 | |
| 6 | ∞ | 11.00 | 1.7381 |
| 7 | −102.927 | | |

$L = 30.5 = 0.2187F_0$, $R_2/F_0 = -0.2687$
$N_3 = 1.7381$, $F_{12} = -1283.46 = -9.207F_0$

Embodiment 5

$F_0 = 137.9$
$F/N = 1:34.5$
$W = \pm 44.7°$

| | R | TH | N |
|---|---|---|---|
| 1 | ∞ | 20.00 | |

-continued

| | | | |
|---|---|---|---|
| 2 | −33.918 | 8.31 | 1.7381 |
| 3 | −27.614 | 2.14 | |
| 4 | −27.080 | 6.00 | 1.5107 |
| 5 | −47.573 | 1.08 | |
| 6 | ∞ | 10.0 | 1.7381 |
| 7 | −108.174 | | |

$L = 27.52 = 0.1996F_0$, $R_2/F_0 = -0.2460$
$N_3 = 1.7381$, $F_{12} = -1900.53 = -13.782F_0$

Each of embodiments shown in the above is arranged that the aperture stop (entrance pupil) is located on the first surface $R_1$. In the numerical data shown in the above, reference symbol $F_0$ represents the focal length of the F-$\theta$ lens system as a whole, reference symbol F/N represents the aperture ratio, reference symbol W represents the scanning angle, reference symbol $R_1$ represents he reflecting surface of the light beam deflector, reference symbols $R_2$ through $R_7$ respectively represent radii of curvature of respective lens surfaces, reference symbol $TH_1$ represents the distance (clearance) between the refracting surface of the light beam deflector and f-$\theta$ lens system when the scanning angle is zero, reference symbols $TH_2$ through $TH_6$ respectively represent distances between respective lens surfaces, and reference symbols $N_1$, $N_2$ and $N_3$ respectively represent refractive indices of respective lenses, The numerical data shown in the above show values for the wavelength of 780 nm.

The ultra-wide angle f-$\theta$ lens system according to the present invention has an extremely large scanning angle ($\pm 45°$) and shows an imaging performance of laser beam waist close to the diffraction limit in spite of the fact that said f-$\theta$ lens system is arranged compactly to have the three-lens composition.

I claim:

1. An ultra-wide angle f-$\theta$ lens system comprising, in the order from the light beam deflector side, a first lens component having positive power, a second lens component having negative power, and a third lens component having positive power, said ultra-wide angle f-$\theta$ lens system fulfilling the following conditions:

$0.19F_0 \leq L \leq 0.23F_0$      (1)

$-0.35 \leq R_2/F_0$      (2)

$1.60 \leq n$      (3)

$-5.0F_0 \geq F_{12}$      (4)

where, reference symbol L represents the overall length of the lens system as a whole, reference symbol $F_0$ represents the focal length of the lens system as a whole, reference symbol $R_2$ represents the radius of curvature of the surface on the light beam deflector side of the first lens component, reference symbol n represents the refractive index of the third lens component for the wavelength of 780 nm, and reference symbol $F_{12}$ represents the total focal length of the first and second lens components.

2. An ultra-wide angle f-$\theta$ lens system according to claim 1 having the following numerical data:

$F_0 = 137.93$
$F/N = 1:34.5$
$W = \pm 44.7°$

-continued

|   | R      | TH   | N      |
|---|--------|------|--------|
| 1 | ∞      | 16.2 |        |
| 2 | −29.35 | 8.0  | 1.6280 |
| 3 | −25.03 | 3.0  |        |
| 4 | −24.93 | 6.0  | 1.5107 |
| 5 | −39.83 | 1.0  |        |
| 6 | ∞      | 11.0 | 1.6280 |
| 7 | −86.28 |      |        |

$L = 29.0 = 0.210F_0$, $R_2/F_0 = -0.2128$
$N_3 = 1.6280$, $F_{12} = -846.12 = -6.134F_0$ where, reference symbol $F_0$ represents the focal length of the f-$\theta$ lens system as a whole, reference symbol F/N represents the aperture ratio, reference symbol W represents the scanning angle, reference symbol $R_1$ represents the refracting surface of the light beam deflector, reference symbols $R_2$ through $R_7$ respectively represent radii of curvature of respective lens surfaces, reference symbol $TH_1$ represents the distance (clearance) between the reflecting surface of the light beam deflector and f-$\theta$ lens system when the scanning angle is zero, reference symbols $TH_2$ through $TH_6$ respectively represent distances between respective lens surfaces, and reference symbols $N_1$, $N_2$ and $N_3$ respectively represent refractive indices of respective lenses for the wavelength of 780 nm.

3. An ultra-wide angle f-$\theta$ lens system according to claim 1 having the following numerical data:

$F_0 = 137.90$
$F/N = 1:34.48$
$W = \pm 44.7°$

|   | R       | TH   | N      |
|---|---------|------|--------|
| 1 | ∞       | 16.2 |        |
| 2 | −31.50  | 8.52 | 1.7381 |
| 3 | −30.10  | 3.00 |        |
| 4 | −28.88  | 6.00 | 1.5107 |
| 5 | −39.80  | 1.00 |        |
| 6 | ∞       | 9.00 | 1.7381 |
| 7 | −109.18 |      |        |

$L = 27.52 = 0.1996F_0$, $R_2/F_0 = -0.2284$
$N_3 = 1.7381$, $F_{12} = -1536.5 = -11.14F_0$ where, reference symbol $F_0$ represents the focal length of the f-$\theta$ lens system as a whole, reference symbol F/N represents the aperture ratio, reference symbol W represents the scanning angle, reference symbol $R_1$ represents the reflecting surface of the light beam deflector, reference symbols $R_2$ through $R_7$ respectively represent radii of curvature of respective lens surfaces, reference symbol $TH_1$ represents the distance (clearance) between the reflecting surface of the light beam deflector and f-$\theta$ lens system when the scanning angle is zero, reference symbols $TH_2$ through $TH_6$ respectively represent distances between respective lens surfaces, and reference symbols $N_1$, $N_2$ and $N_3$ respectively represent refractive indices of respective lenses for the wavelength of 780 nm.

4. An ultra-wide angle f-$\theta$ lens system according to claim 1 having the following numerical data:

$F_0 = 138.1$
$F/N = 1:34.5$
$W = \pm 44.7°$

|   | R       | TH    | N      |
|---|---------|-------|--------|
| 1 | ∞       | 23.00 |        |
| 2 | −37.21  | 8.00  | 1.7381 |
| 3 | −25.44  | 0.80  |        |
| 4 | −24.67  | 6.00  | 1.5107 |
| 5 | −57.64  | 0.50  |        |
| 6 | ∞       | 11.00 | 1.7381 |
| 7 | −103.79 |       |        |

$L = 26.30 = 0.1905F_0$, $R_2/F_0 = -0.2694$
$N_3 = 1.7381$, $F_{12} = -1633.97 = -11.832F_0$ where, reference symbol $F_0$ represents the focal length of the f-$\theta$ lens system as a whole, reference symbol F/N represents the aperture ratio, reference symbol W represents the scanning angle, reference symbol $R_1$ represents the reflecting surface on the light beam deflector, reference symbols $R_2$ through $R_7$ respectively represent radii of curvature of respective lens surfaces, reference symbol $TH_1$ represents the distance (clearance) between the reflecting surface of the light beam deflector and f-$\theta$ lens system when the scanning angle is zero, reference symbols $TH_2$ through $TH_6$ respectively represent distances between respective lens surfaces, and reference symbols $N_1$, $N_2$ and $N_3$ respectively represent refractive indices of respective lenses for the wavelength of 780 nm.

5. An ultra-wide angle f-$\theta$ lens system according to claim 1 having the following numerical data:

$F_0 \times 139.4$
$F/N = 1:34.9$
$W = \pm 44.2°$

|   | R        | TH   | N      |
|---|----------|------|--------|
| 1 | ∞        | 20.0 |        |
| 2 | −37.460  | 9.00 | 1.7381 |
| 3 | −25.107  | 3.00 |        |
| 4 | −24.992  | 6.50 | 1.5107 |
| 5 | −68.121  | 1.00 |        |
| 6 | ∞        | 11.00| 1.7381 |
| 7 | −102.927 |      |        |

$L = 30.5 = 0.2187F_0$, $R_2/F_0 = -0.2687$
$N_3 = 1.7381$, $F_{12} = -1283.46 = -9.207F_0$ where, reference symbol $F_0$ represents the focal length of the f-$\theta$ lens system as a whole, reference symbol F/N represents the aperture ratio, reference symbol W represents the scanning angle, reference symbol $R_1$ represents the reflecting surface of the light beam deflector, reference symbols $R_2$ through $R_7$ respectively represent radii of curvature of respective lens surfaces, reference symbol $TH_1$ represents the distance (clearance) between the reflecting surface of the light beam deflector and f-$\theta$ lens system when the scanning angle is zero, reference symbols $TH_2$ through $TH_6$ respectively represent distances between respective lens surfaces, and reference symbols $N_1$, $N_2$ and $N_3$ respectively represent refractive indices of respective lenses for the wavelength of 780 nm.

6. An ultra-wide angle f-$\theta$ lens system according to claim 1 having the following numerical data:

$F_0 = 137.9$
$F/N = 1:34.5$
$W = \pm 44.7°$

|   | R       | TH    | N      |
|---|---------|-------|--------|
| 1 | ∞       | 20.00 |        |
| 2 | −33.918 | 8.31  | 1.7381 |
| 3 | −27.614 | 2.14  |        |
| 4 | −27.080 | 6.00  | 1.5107 |

-continued

| 5 | −47.573 | 1.08 | |
| 6 | ∞ | 10.0 | 1.7381 |
| 7 | −108.174 | | |

$L = 27.52 = 0.1996 F_0$, $R_2/F_0 = -0.2460$
$N_3 = 1.7381$, $F_{12} = -1900.53 = -13.782 F_0$ where, reference symbol $F_0$ represents the focal length of the f-$\theta$ lens system as a whole, reference symbol F/N represents the aperture ratio, reference symbol W represents the scanning angle, reference symbol $R_1$ represents the reflecting surface of the light beam deflector, reference symbols $R_2$ through $R_7$ respectively represent radii of curvature of respective lens surfaces, reference symbol $TH_1$ represents the distance (clearance) between the reflecting surface of the light beam deflector and f-$\theta$ lens system when the scanning angle is zero, reference symbols $TH_2$ through $TH_6$ respectively represent distances between respective lens surfaces, and reference symbols $N_1$, $N_2$ and $N_3$ respectively represent refractive indices of respective lenses for the wavelength of 780 nm.

* * * * *

UNITED STATES PATENT AND TRADEMARK OFFICE
CERTIFICATE OF CORRECTION

PATENT NO. : 4,787,723
DATED : November 29, 1988
INVENTOR(S) : Toshifumi Uetake

It is certified that error appears in the above—identified patent and that said Letters Patent is hereby corrected as shown below:

Column 4, line 15 reads "F-$\theta$" should read --f-$\theta$--;

Claim 5, line 5 (column 6, line 30) reads "$F_o$ x 139.4" should read --$F_o$ = 139.4--; and Claim 5, line 15 (column 6, line 40) reads "0.2187$F_o$,$R_2/F_o$" should read --0.2187$F_o$, $R_2/F_o$--.

Signed and Sealed this

Twentieth Day of June, 1989

*Attest:*

DONALD J. QUIGG

*Attesting Officer*  *Commissioner of Patents and Trademarks*